US010449779B2

(12) United States Patent
Yoshikawa

(10) Patent No.: US 10,449,779 B2
(45) Date of Patent: Oct. 22, 2019

(54) IMAGE PROCESSING APPARATUS, PRINTING APPARATUS, AND PROGRAM

(71) Applicant: SEIKO EPSON CORPORATION, Tokyo (JP)

(72) Inventor: Eishin Yoshikawa, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/005,945

(22) Filed: Jun. 12, 2018

(65) Prior Publication Data

US 2018/0361755 A1 Dec. 20, 2018

(30) Foreign Application Priority Data

Jun. 14, 2017 (JP) ................................. 2017-116545

(51) Int. Cl.
*B41J 2/21* (2006.01)
*H04N 1/60* (2006.01)
*H04N 1/50* (2006.01)

(52) U.S. Cl.
CPC ............. *B41J 2/2114* (2013.01); *B41J 2/211* (2013.01); *H04N 1/506* (2013.01); *H04N 1/6016* (2013.01)

(58) Field of Classification Search
CPC ......... B41J 2/2114; B41J 2/211; H04N 1/506; H04N 1/6016
See application file for complete search history.

(56) References Cited

U.S. PATENT DOCUMENTS

| 2004/0061760 | A1 | 4/2004 | Yano et al. |
| 2009/0315937 | A1 | 12/2009 | Kubota et al. |
| 2010/0005991 | A1 | 1/2010 | Yoshida |
| 2010/0328389 | A1* | 12/2010 | Kunimine ............... B41J 2/2114 347/14 |

FOREIGN PATENT DOCUMENTS

| JP | 2002-321349 A | 11/2002 |
| JP | 2004-082710 A | 3/2004 |
| JP | 2010-000791 A | 1/2010 |
| JP | 2010-012751 A | 1/2010 |
| JP | 2011-025687 A | 2/2011 |

* cited by examiner

*Primary Examiner* — Yaovi M Ameh

(57) ABSTRACT

An image processing apparatus, configured to generate print data to be outputted to a printing apparatus that prints an image by ejecting preprocessing liquid and ink onto a medium, includes a color conversion unit that converts image data representing the image into an amount of the preprocessing liquid, and a type and an amount of the ink for printing the image, and a print data generation unit that generates the print data on a basis of the amount of the preprocessing liquid and the type and amount of the ink. The color conversion unit converts the image data such that, when the amount of the preprocessing liquid for printing one pixel of a first image on the medium is defined as a first preprocessing liquid amount, and the amount of the preprocessing liquid for printing one pixel of a second image on the medium is defined as a second preprocessing liquid amount, the amount of the preprocessing liquid for printing a first layered pixel, in which the one pixel of the second image is superposed on the one pixel of the first image, becomes less than a total of the first preprocessing liquid amount and the second preprocessing liquid amount.

13 Claims, 10 Drawing Sheets

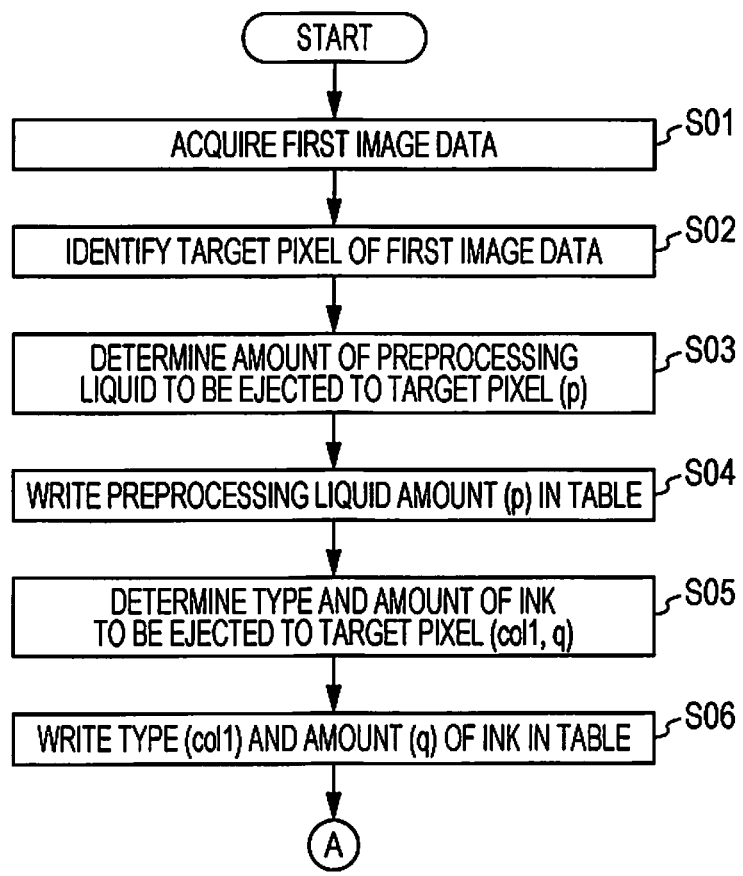

FIG. 6

| EJECTION ORDER | LIQUID TO BE EJECTED | PIXEL | | | | |
|---|---|---|---|---|---|---|
| | | a | b | c | d | ... |
| 1 | op1 | PREPROCESSING LIQUID | — | — | PREPROCESSING LIQUID | ... |
| | | p | 0 | 0 | p | ... |
| 2 | col1 | MAGENTA (M) | — | — | YELLOW (Y) | ... |
| | | q | 0 | 0 | q | ... |
| 3 | op2 | — | PREPROCESSING LIQUID | PREPROCESSING LIQUID | — | ... |
| | | 0 | r | r | 0 | ... |
| 4 | op2' | PREPROCESSING LIQUID | — | — | PREPROCESSING LIQUID | ... |
| | | r − α1 | 0 | 0 | r − α1 | ... |
| 5 | col2 | WHITE (W) | WHITE (W) | WHITE (W) | WHITE (W) | ... |
| | | s | s | s | s | ... |
| ... | ... | | | | | |

| EJECTION ORDER | LIQUID TO BE EJECTED | PIXEL | | | | |
|---|---|---|---|---|---|---|
| | | a | b | c | d | ... |
| 1 | op1 | PREPROCESSING LIQUID p | — o | — o | PREPROCESSING LIQUID p | ... |
| 2 | col1 | MAGENTA (M) q | — o | — o | YELLOW (Y) q | ... |
| 3 | op2 | — o | — o | PREPROCESSING LIQUID r | — o | ... |
| 4 | op2' | PREPROCESSING LIQUID r−α1 | — o | — o | PREPROCESSING LIQUID r−α1 | ... |
| 5 | col2 | WHITE (W) s | — o | WHITE (W) s | WHITE (W) s | ... |
| 6 | op3 | — o | PREPROCESSING LIQUID t | — o | — o | ... |
| 7 | op3' | — o | — o | — o | PREPROCESSING LIQUID t−α2 | ... |
| 8 | col3 | — o | CYAN (C) q | — o | BLACK (K) q | ... |
| ... | ... | ... | ... | ... | ... | ... |

D2

IMAGE PROCESSING APPARATUS, PRINTING APPARATUS, AND PROGRAM

BACKGROUND

1. Technical Field

The present invention relates to an image processing apparatus that generates print data for printing a plurality of images superposed on each other on a medium, a printing apparatus that performs printing on the basis of the print data, and a program for controlling the image processing apparatus.

2. Related Art

A technique to print an image formed of a plurality of ink layers on a medium is known, for example as disclosed in JP-A-2010-12751. With such a technique, different images (a first image and a second image) can be visibly formed on a front surface and a back surface of the medium, by sequentially printing the first image formed of a color ink layer, a white ink layer, and a second image formed of another color ink layer, for example on a surface of a transparent medium (hereinafter, "on the surface of the medium" will be referred to as "on the medium"). In addition, printing the white ink layer contributes to improving the color-forming performance of the color ink layer.

In the case of thus ejecting ink of an upper layer on the surface of the ink of a lower layer (hereinafter, "on the surface of the ink" will be referred to as "on the ink"), or ejecting ink on a medium having a non-absorbent surface such as polyvinyl chloride or polyethylene terephthalate (PET), on which the ink is difficult to be fixed, a processing liquid containing a coagulant, such as magnesium sulphate solution (hereinafter, preprocessing liquid), may be applied on the medium or the ink of the lower layer, before the ink is ejected. The preprocessing liquid facilitates the color material in the ink to coagulate, and therefore the viscosity of the ink ejected onto the preprocessing liquid is increased. Accordingly, the ink is restricted from spreading, and facilitated to remain at the ejected position on the medium (thus exhibiting improved fixability), despite the medium being polyvinyl chloride or the like. Thus, the ink is kept from being mixed with neighboring ink, which leads to improved color-forming performance, and as result a clear image can be obtained.

Further, JP-A-2011-25687 discloses a technique to reduce consumption of a processing liquid for coating and protecting the ink layers superposed for the printing.

As described above, applying the preprocessing liquid on the medium on which the ink is difficult to be fixed, such as polyvinyl chloride, is effective to improve the fixability of the ejected ink, thus to form a clear image. On the other hand, normally the surface of the ink of the lower layer more effectively restricts the newly ejected ink (ink of the upper layer) from spreading, than the surface of polyvinyl chloride or the like, and therefore it suffices to apply a small amount of the preprocessing liquid and, depending on the type of the ink of the lower layer, the application of the preprocessing liquid on the ink of the lower layer may even be skipped. In addition, the preprocessing liquid applied to fix the ink of the lower layer may contribute to improving the fixability of the ink of the upper layer. Further, the preprocessing liquid applied on the ink of the lower layer to fix the ink of the upper layer may contribute to improving the fixability of the ink of the lower layer.

For the mentioned reason, when the ink of the upper layer is ejected (superposed) on the ink of the lower layer to perform the printing, the amount of the preprocessing liquid, to be applied on the ink of the lower layer to fix the ink of the upper layer, can be reduced, in accordance with at least the type of the ink of the lower layer, and the amount of the preprocessing liquid applied to fix the ink of the lower layer. Therefore, the preprocessing liquid can be saved by properly adjusting the amount of the preprocessing liquid applied on the ink of the lower layer.

However, JP-A-2010-12751 and JP-A-2011-25687 make no reference to a technique to properly adjust the amount of the preprocessing liquid, when the printing process includes superposing the images. Therefore, a technique to generate print data that allows reduction in consumption of the preprocessing liquid has not yet been proposed.

SUMMARY

An advantage of some aspects of the invention is to provide an image processing apparatus, configured to generate print data that allows an appropriate amount of preprocessing liquid to be determined, when printing images by superposing a plurality of ink layers, a printing apparatus that executes printing on the basis of the print data, and a program for controlling the image processing apparatus.

The invention may be advantageously realized as the following application examples or embodiments.

Here, the term "image" herein used refers to patterns such as characters and graphics expressed on a medium, "image data" refers to data of the image digitized by applying the image on two-dimensional coordinates, and "print data" refers to data for operating the printing apparatus so as to form the image on the basis of the image data.

Application Example 1

A first application example represents an image processing apparatus configured to generate print data to be outputted to a printing apparatus that prints an image by ejecting preprocessing liquid and ink onto a medium. The image processing apparatus includes a color conversion unit that converts image data representing the image into an amount of the preprocessing liquid, and a type and an amount of the ink for printing the image, and a print data generation unit that generates the print data on a basis of the amount of the preprocessing liquid and the type and amount of the ink. The color conversion unit converts the image data such that, when the amount of the preprocessing liquid for printing one pixel of a first image on the medium is defined as a first preprocessing liquid amount, and the amount of the preprocessing liquid for printing one pixel of a second image on the medium is defined as a second preprocessing liquid amount, the amount of the preprocessing liquid for printing a first layered pixel, in which the one pixel of the second image is superposed on the one pixel of the first image, becomes less than a total of the first preprocessing liquid amount and the second preprocessing liquid amount.

The mentioned image processing apparatus includes the color conversion unit that converts the image data representing the image into the amount of the preprocessing liquid, and the type (e.g., color and material) and the amount of the ink for printing the image. The color conversion unit converts the image data such that the amount of the preprocessing liquid for printing the first layered pixel, in which the one pixel of the second image is superposed on the one pixel of the first image, becomes less than the total of the amount of the preprocessing liquid for printing one pixel of the first image on the medium and the amount of the preprocessing liquid for printing one pixel of the second image on the medium. The image processing apparatus further includes the print data generation unit that generates the print data on the basis of the amount of the preprocessing liquid and the type and amount of the ink, converted by the color conversion unit. Therefore, when the printing process includes superposing the first image and the second image, the print data is generated so as to reduce the amount of the preprocessing liquid, compared with the total amount of the preprocessing liquid that would be required when the first image and the second image are individually printed on the medium. As result, the preprocessing liquid can be saved.

Application Example 2

In the foregoing image processing apparatus, preferably, when the one pixel of the second image is superposed on the one pixel of the first image in the first layered pixel, the color conversion unit may perform the conversion such that the amount of the preprocessing liquid for printing the first layered pixel accords with a total of the first preprocessing liquid amount, and a corrected preprocessing liquid amount obtained by subtracting a designated amount from the second preprocessing liquid amount.

With the mentioned arrangement, when the first layered pixel is printed by superposing the one pixel of the second image on the one pixel of the first image printed on the medium, the amount of the preprocessing liquid for printing the first layered pixel is set to the total of the first preprocessing liquid amount, and the corrected preprocessing liquid amount obtained by subtracting a designated amount from the second preprocessing liquid amount. In this case, the first preprocessing liquid amount "remains unchanged, while the designated amount is subtracted from the second preprocessing liquid amount, to print the first layered pixel. Thus, it suffices to process only the second preprocessing liquid amount, without changing the first preprocessing liquid amount. As result, the process can be simplified, and the preprocessing liquid can be saved.

Application Example 3

In the foregoing image processing apparatus, preferably, the designated amount may be determined on a basis of at least one of the first preprocessing liquid amount, and a type and an amount of the ink for printing the one pixel of the first image in the first layered pixel.

In this case, the designated amount to be subtracted from the second preprocessing liquid amount is determined on the basis of at least one of the preprocessing liquid amount, the type, and the amount of the ink for printing the first image in the first layered pixel. Accordingly, the corrected preprocessing liquid amount for the second image, to be applied on the ink that has printed the first image, is determined according to the condition of the ink. Therefore, an appropriate amount of the preprocessing liquid can be determined for the printing process including superposing the one pixel of the second image on the one pixel of the first image, so as to reduce the amount of the preprocessing liquid. As result, the preprocessing liquid can be saved.

Application Example 4

In the foregoing image processing apparatus, preferably, the print data generation unit may generate the print data with respect to the first layered pixel, including the first preprocessing liquid amount, an amount of the ink for printing the one pixel of the first image, an amount of the corrected preprocessing liquid, an amount of the ink for printing the one pixel of the second image, and an ejection order of the preprocessing liquid and the ink.

In this case, the amount of all the preprocessing liquids and all the inks, necessary for printing the first layered pixel, are included in the print data. In addition, the print data includes the printing order (ejection order) of each of the preprocessing liquids and the inks. Thus, the print data that enables the printing apparatus to execute the printing of the image can be obtained.

Application Example 5

In the foregoing image processing apparatus, preferably, the color conversion unit may perform the conversion such that the amount of the preprocessing liquid for printing the first layered pixel becomes equal to the first preprocessing liquid amount.

In this case, the amount of the preprocessing liquid for printing the first layered pixel corresponds to the first preprocessing liquid amount. In other words, the designated amount subtracted from the second preprocessing liquid amount is set to be equal to the second preprocessing liquid amount itself, so that the corrected preprocessing liquid amount becomes zero, and the first layered pixel is printed only with the first preprocessing liquid amount. Therefore, the preprocessing liquid can be saved to the maximum extent, in the printing process of the first layered pixel.

Application Example 6

In the foregoing image processing apparatus, in a case where a third image is to be superposed on at least one of an amount of the first image and the second image, and when the preprocessing liquid for printing one pixel of the third image on the medium is defined as a third preprocessing liquid amount, it is preferable that the color conversion unit converts the image data such that the amount of the preprocessing liquid for printing a second layered pixel, in which the one pixel of the third image is superposed on at least one of the one pixel of the first image and the one pixel of the second image, becomes less than a total of at least one of the first preprocessing liquid amount and the second preprocessing liquid amount, and the third preprocessing liquid amount.

With the mentioned arrangement, when the second layered pixel, in which the one pixel of the third image is superposed on at least one of the one pixel of the first image and the one pixel of the second image, is to be printed, the amount of the preprocessing liquid can be made less than the total of the first preprocessing liquid amount and the third preprocessing liquid amount, or the total of the second preprocessing liquid amount and the third preprocessing liquid amount. Therefore, the preprocessing liquid can be saved, when the second layered pixel is printed.

Application Example 7

A seventh application example represents a printing apparatus including a printing unit that executes printing on a basis of print data, the printing unit being configured to execute the printing according to the print data generated by the foregoing image processing apparatus.

The mentioned printing apparatus is configured to execute the printing according to the print data generated by the foregoing image processing apparatus. Accordingly, the printing is executed on the basis of the print data generated so as to reduce the amount of the preprocessing liquid, to be used for the printing. Therefore, the preprocessing liquid can be saved, and the printed image printed on the medium exhibits high ink fixability and high color-forming performance.

Application Example 8

An eighth application example represents a program for controlling an image processing apparatus that generates print data for printing an image by ejecting preprocessing liquid and ink onto a medium. The program is configured to cause the image processing apparatus to execute a first conversion process including converting image data representing the image into an amount of the preprocessing liquid for printing the image and a type and an amount of the ink, a generation process including generating the print data on a basis of the amount of the preprocessing liquid and the type and amount of the ink, and a second conversion process including converting the image data such that, when the amount of the preprocessing liquid for printing one pixel of a first image on the medium is defined as a first preprocessing liquid amount, and the amount of the preprocessing liquid for printing one pixel of a second image on the medium is defined as a second preprocessing liquid amount, the amount of the preprocessing liquid for printing a first layered pixel, in which the one pixel of the second image is superposed on the one pixel of the first image, becomes less than a total of the first preprocessing liquid amount and the second preprocessing liquid amount.

The mentioned program is configured to cause the image processing apparatus to execute the first conversion process including converting the image data representing the image into the amount of the preprocessing liquid for printing the image and the type and amount of the ink. The second conversion process is performed such that the amount of the preprocessing liquid for printing the first layered pixel, in which the one pixel of the second image is superposed on the one pixel of the first image, becomes less than the total of the amount of the preprocessing liquid for printing one pixel of the first image on the medium and the amount of the preprocessing liquid for printing one pixel of the second image on the medium. Thus, the second conversion process is an example of the first conversion of the image data into the amount of the preprocessing liquid. The program further includes generating the print data on the basis of the amount of the preprocessing liquid and the amount of the ink, converted through the first conversion process and the second conversion process. Therefore, when the printing process includes superposing the first image and the second image, the print data is generated so as to reduce the amount of the preprocessing liquid, compared with the total amount of the preprocessing liquid that would be required when the first image and the second image are individually printed on the medium. As result, the preprocessing liquid can be saved.

BRIEF DESCRIPTION OF THE DRAWINGS

The invention will be described with reference to the accompanying drawings, wherein like numbers reference like elements.

FIG. 3A is a flowchart showing an operation flow of an image processing apparatus.

FIG. 6 is a table representing an example of print data according to the first embodiment.

FIG. 8 is a table representing an example of print data according to the second embodiment.

DESCRIPTION OF EXEMPLARY EMBODIMENTS

First Embodiment

Figure 1:
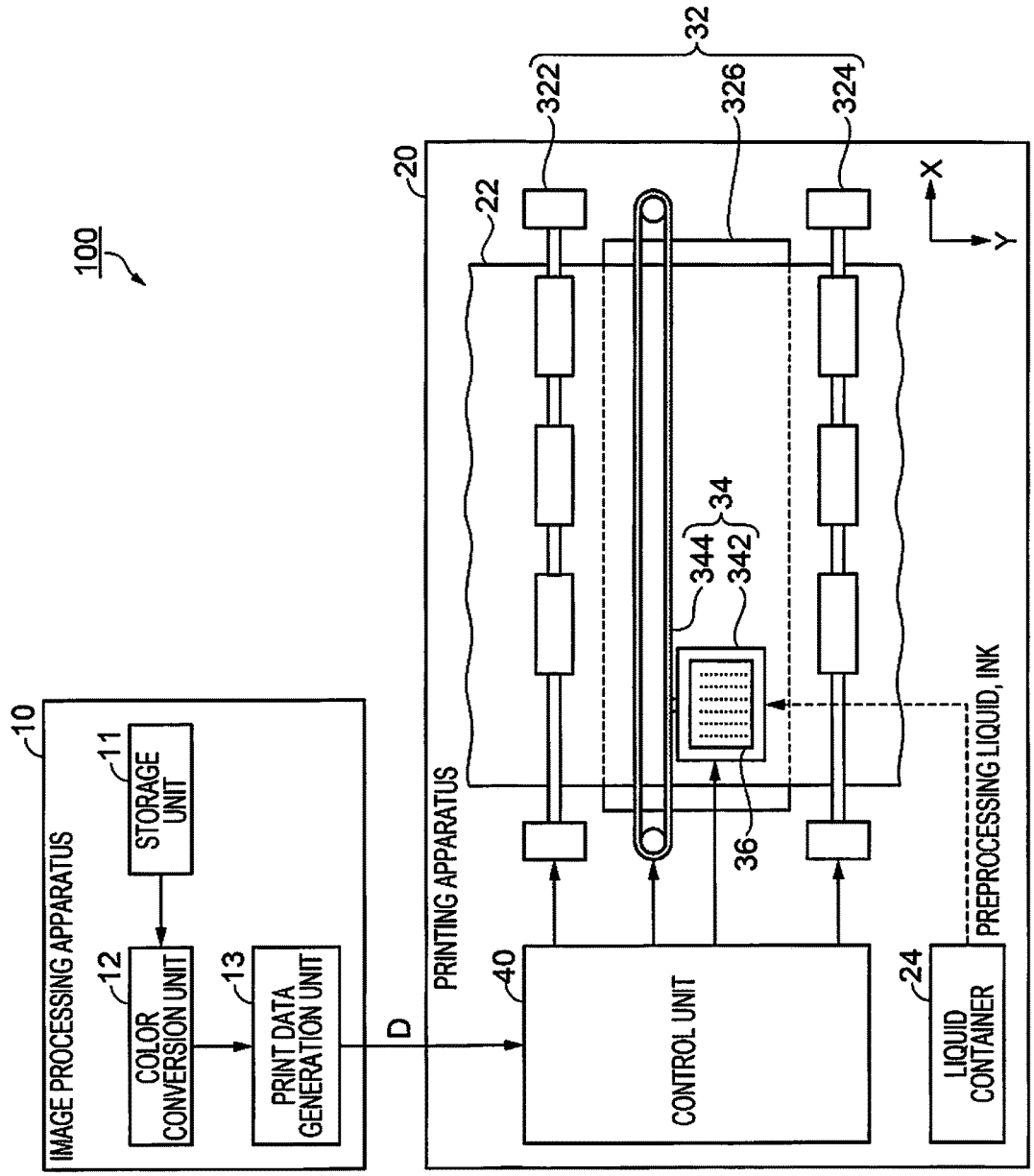
FIG. 1 is a schematic block diagram showing a configuration of a printing system.

Hereafter, a first embodiment of an image processing apparatus 10 and a printing apparatus 20 according to the invention will be described, with reference to the drawings. The first embodiment represents the case where the image processing apparatus 10 is realized as an information processing apparatus such as a personal computer (PC), and the printing apparatus 20 is realized as an ink jet printer that prints an image on a non-absorbent medium 22 formed of, for example, polyvinyl chloride.

In the drawings referred to in the following description, the scale and aspect ratio of the components may differ from the actual ones, for convenience sake. Components other than those indispensable for the description may be excluded from the drawings. Further, some of the drawings include indication of an X-axis and a Y-axis orthogonal to each other. The distal side of arrows indicating the respective directions will be referred to as "plus side", and the proximal side of the arrows will be referred to as "minus side". A direction parallel to the X-axis will be referred to as "X-axis direction", and a direction parallel to the Y-axis will be referred to as "Y-axis direction".

Printing System

FIG. 1 is a schematic block diagram showing a configuration of a printing system 100, including the image processing apparatus 10 and the printing apparatus 20. Before proceeding to the function, configuration, and working of the image processing apparatus 10, the printing apparatus 20 will be described first.

Printing Apparatus

The printing apparatus 20 according to this embodiment is an ink jet printer that ejects ink onto the medium 22 to thereby print an image on the medium 22. The printing apparatus 20 also ejects preprocessing liquid to the medium 22, in a similar manner to ejecting the ink, to apply the preprocessing liquid on the medium 22. The medium 22 is a recording medium such as a printing sheet or film, on which the image is to be printed. In the first embodiment, the medium 22 is a non-absorbent sheet formed of polyvinyl chloride.

As shown in FIG. 1, the printing apparatus 20 includes a liquid container 24 for storing liquid. In the liquid container 24, preprocessing liquid and ink are stored.

The ink is liquid containing a pigment or dye (color ink). For example, inks of five colors, namely cyan (C), magenta (M), yellow (Y), black (K), and white (W) are stored in the liquid container 24. A resin material may also be contained in the ink.

The preprocessing liquid primarily serves to restrict the ink ejected onto the medium 22 from spreading, to thereby improve the fixability (optimizer ink), and contains a reacting component that reacts with the ink, for example a coagulant, and a solution component such as water or a solvent. Examples of the coagulant in the preprocessing liquid include multivalent metal salts, such as magnesium sulphate. The color material or resin material contained in the ink is not contained in the preprocessing liquid. However, the preprocessing liquid may also contain a surfactant.

Although a single piece of the liquid container 24 is illustrated in FIG. 1 for convenience sake, the preprocessing liquid and a plurality of types of ink may be stored in independent liquid containers 24, or the plurality of types of ink may each be stored in an independent liquid container 24.

The printing apparatus 20 includes a printing unit including a control unit 40, a transport mechanism 32, a moving mechanism 34, and a printing head 36. The control unit 40 includes a control circuit such as a central processing unit (CPU) or an application specific integrated circuit (ASIC), and a non-illustrated storage unit such as a semiconductor memory, and integrally controls the cited components of the printing apparatus 20, on the basis of print data D received from the image processing apparatus 10. The function of the control unit 40 is realized when the CPU executes a program stored in the storage unit.

The transport mechanism 32 transports the medium 22 to the plus side in the Y-axis direction, under the control of the control unit 40. The transport mechanism 32 includes a feed roller 322, a discharge roller 324, and a medium retainer 326. The feed roller 322 and the discharge roller 324 each pinch the medium 22 with a corresponding slave roller (not shown), to transport the medium 22 to the plus side in the Y-axis direction. The medium retainer 326 is a flat plate-shaped structure (platen) on which the medium 22 transported by the feed roller 322 and the discharge roller 324 is mounted. The medium 22 is transported along the surface of the medium retainer 326. The configuration of the transport mechanism 32 is not limited to the mentioned example, but may be arranged as desired, provided that the medium 22 can be transported to the plus side or minus side in the Y-axis direction.

The moving mechanism 34 causes the printing head 36 to reciprocate in the X-axis direction, under the control of the control unit 40. The X-axis direction, in which the printing head 36 is made to reciprocate, is a direction intersecting (typically, orthogonal to) the Y-axis direction in which the medium 22 is transported. The moving mechanism 34 includes a carriage 342 supporting the printing head 36, and a transport belt 344 running in the X-axis direction, so as to form an endless track. When the control unit 40 causes the transport belt 344 to move, the printing head 36 supported by the carriage 342 reciprocates in the X-axis direction. The configuration of the moving mechanism 34 is not limited to the mentioned example, but may be arranged as desired, provided that the printing head 36 can be made to reciprocate in the X-axis direction. Further, the liquid container 24 may also be mounted on the carriage 342, together with the printing head 36.

The printing head 36 is a liquid ejection mechanism configured to eject, under the control of the control unit 40, the preprocessing liquid and the ink supplied from the liquid container 24, onto the medium 22. By the ejection of the preprocessing liquid and the ink from the printing head 36 onto the medium 22, performed at the same time that the transport mechanism 32 transports the medium 22 and the moving mechanism 34 causes the printing head 36 to reciprocate, a plurality of pixels are printed, so that a desired image is formed on the medium 22.

Figure 2:
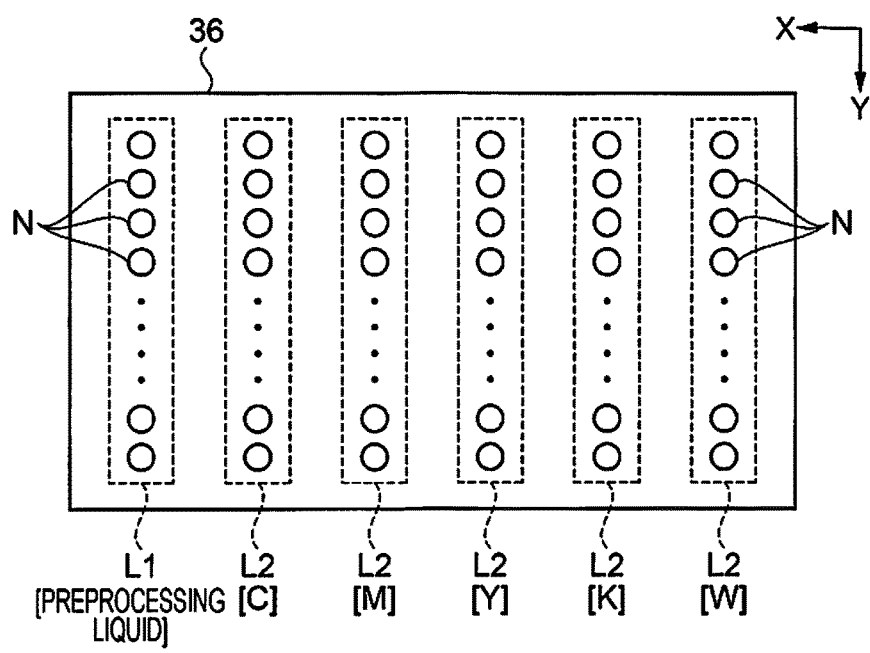
FIG. 2 is a plan view showing an ejecting surface of a printing head.

FIG. 2 is a plan view showing a surface of the printing head 36 opposing the medium retainer 326 (hereinafter, ejecting surface). As shown in FIG. 2, a first nozzle row L1 and a plurality of second nozzle rows L2 are aligned in the X-axis direction with a spacing therebetween, on the ejecting surface of the printing head 36. The first nozzle row L1 and the second nozzle rows L2 each include a plurality of nozzles N linearly aligned in the Y-axis direction. Here, the first nozzle row L1 and the second nozzle rows L2 may each include a plurality of rows (e.g., a checkerboard array or a staggered array).

The first nozzle row L1 includes the plurality of nozzles N for ejecting the preprocessing liquid supplied from the liquid container 24, onto the medium 22. The plurality of second nozzle rows L2 each include the plurality of nozzles N for ejecting the ink supplied from the liquid container 24, onto the medium 22. More specifically, inks of different colors (C, M, Y, K, W) are ejected from the nozzles N of the respective second nozzle rows L2, as shown in FIG. 2. The preprocessing liquid (coagulant) ejected from each of the nozzles N if the first nozzle row L1 and the inks ejected from each of the nozzles N of the respective second nozzle rows L2 react with each other on the medium 22, so as to restrict the ink from spreading and locally coagulating, thus to improve the print quality. Each one of the nozzles N forms one pixel of the image printed on the medium 22.

The respective positions of the first nozzle row L1 and the plurality of second nozzle rows L2 are not limited to the mentioned example. For example, the first nozzle row L1 may be located on the minus side in the Y-axis direction with respect to the second nozzles row L2 (upstream side in the transport direction of the medium 22).

Image Processing Apparatus

The image processing apparatus 10 is an information processing apparatus such as a PC, and serves to generate the print data D (see FIG. 1) for causing the printing apparatus 20 to execute the printing, on the basis of the image data representing the image to be printed, and to output the print data D to the printing apparatus 20.

The image data is, for example, based on a format compliant to a graphics device interface (GDI), and the color of the pixel corresponding to the two-dimensional coordinate of the image is expressed in multilevel values (e.g., 256 gradations from 0 to 255) of red, green, and blue (RGB). The color of the pixel expressed by RGB is converted into four components of cyan, magenta, yellow, black (CMYK) which are the ink colors of the printing apparatus 20, for example on the basis of a color conversion table (look-up table (LUT)), and included in the print data D. The print data D further includes information specifying the amount and type of the ink, the amount of the preprocessing liquid corresponding to the ink amount, and the ejection order of the ink and the preprocessing liquid. The LUT is a conversion table for converting the pixel data expressed by RGB into the ink data expressed by CMYK, and the amount of the ink and the preprocessing liquid.

The image processing apparatus 10 includes, as shown in FIG. 1, a storage unit 11 for storing the image data, the program, and the LUT, a color conversion unit 12 that coverts, according to the LUT, the image data into the amount of the preprocessing liquid and the type and amount of the ink to be used for printing, and a print data generation unit 13 that generates the print data D on the basis of the amount of the preprocessing liquid and the type and amount of the ink converted by the color conversion unit 12. The image processing apparatus 10 includes a non-illustrated CPU and an ASIC, so that the color conversion unit 12 and the print data generation unit 13 are realized when the CPU operates according to the program stored in the storage unit 11. The storage unit 11 includes, for example, a semiconductor memory or a hard disk drive (HDD). Naturally, the color conversion unit 12 and the print data generation unit 13 may be constituted of hardware such as an electronic circuit.

Control of Image Processing Apparatus

Hereunder, a control (operation) performed by the image processing apparatus 10 will be described, with reference to the flowcharts of FIG. 3A and FIG. 3B, and also to FIG. 4A, FIG. 4B, FIG. 5, and FIG. 6.

Figure 3B:
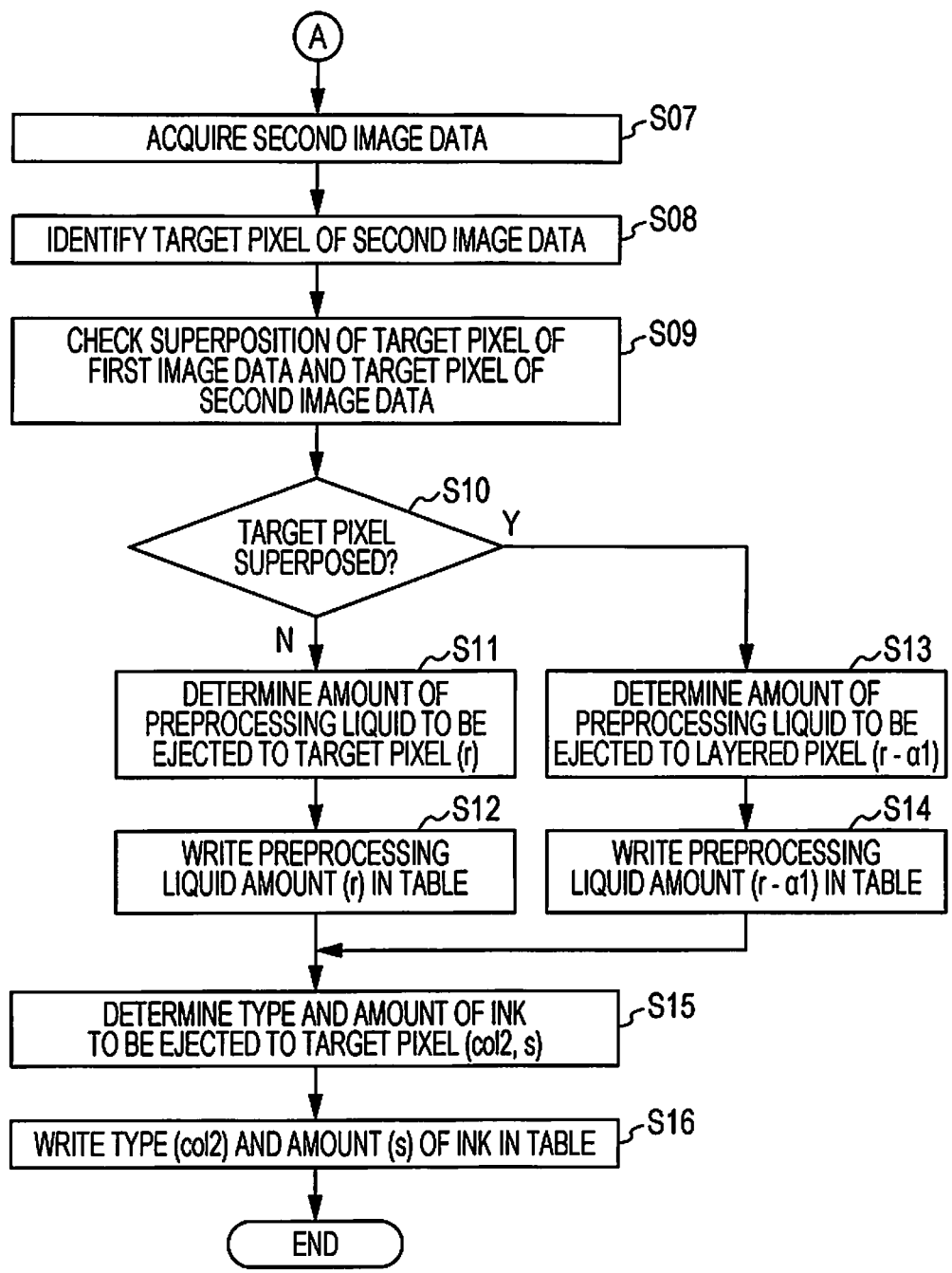
FIG. 3B is a flowchart showing another operation flow of the image processing apparatus.

FIG. 3A and FIG. 3B are flowcharts showing an operation according to the program for controlling the image processing apparatus 10 so as to realize the color conversion unit 12 and the print data generation unit 13. FIG. 3A and FIG. 3B specify a series of processings connected via a point A in these drawings. The flowcharts shown in FIG. 3A and FIG. 3B represent an example of the operation including printing a first image on the medium 22, and then superposing a second image so as to form an image.

Before proceeding to the control performed by the image processing apparatus 10, description will be given about FIG. 4A, FIG. 4B, FIG. 5, and FIG. 6.

Figure 4A:
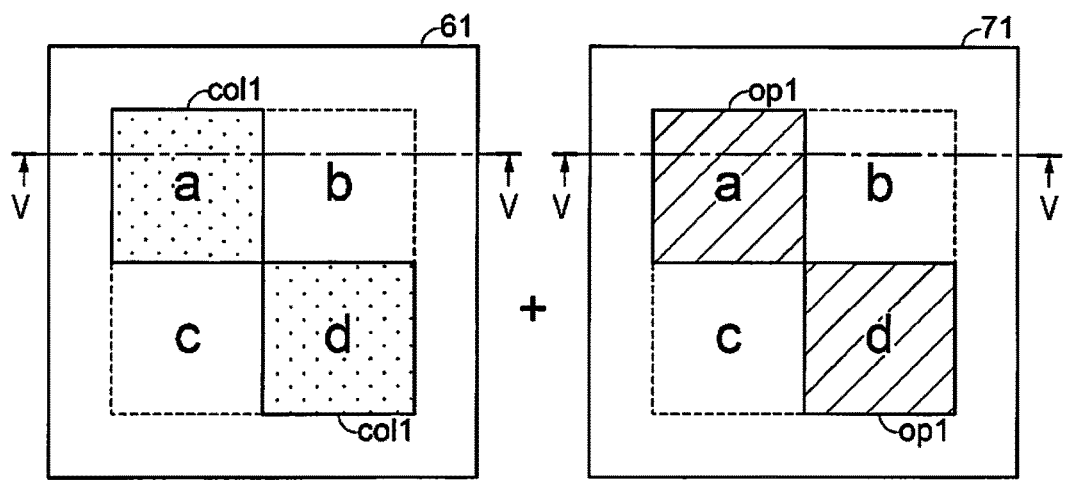
FIG. 4A includes pattern diagrams for explaining a first image according to a first embodiment.

FIG. 4A includes pattern diagrams of the pixel to which the ink and the preprocessing liquid are ejected to print the first image. In FIG. 4A, a pattern diagram 61 represents pixels to which a color ink col1 is ejected, among four pixels, namely pixel "a" to pixel "d", constituting a part of the first image. Likewise, a pattern diagram 71 represents pixels to which a preprocessing liquid op1 is ejected, among the pixel "a" to pixel "d". The respective positions of the pixel "a" to pixel "d" correspond to the two-dimensional coordinate of the image to be printed.

In the first image according to this embodiment, the color ink col1 is ejected to the pixel "a" and the pixel "d", but not to the pixel "b" and the pixel "c", as represented by the pattern diagram 61. Since the preprocessing liquid is intended to react with the ink as described earlier, the preprocessing liquid op1 is ejected to the pixel "a" and the pixel "d", to which the color ink coil is ejected, as represented by the pattern diagram 71. On the other hand, the preprocessing liquid op1 is not ejected to the pixel "b" and the pixel "c", to which the color ink coil is not ejected.

Figure 4B:
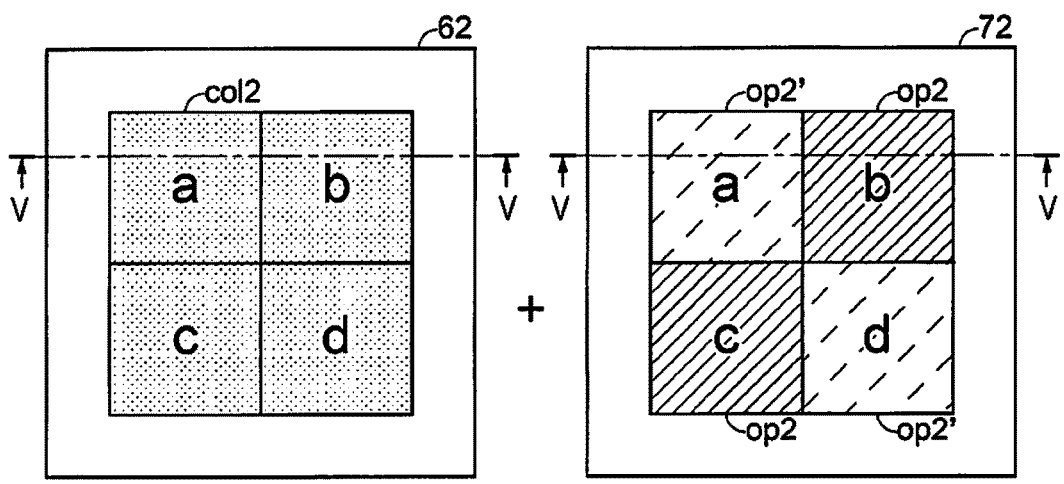
FIG. 4B includes pattern diagrams for explaining a second image according to the first embodiment.

FIG. 4B includes pattern diagrams of the pixel to which the ink and the preprocessing liquid are ejected, to print the second image. In FIG. 4B, a pattern diagram 62 represents pixels to which a color ink col2 is ejected, among pixel "a" to pixel "d" constituting a part of the second image, and a pattern diagram 72 represents pixels to which a preprocessing liquid op2 or a preprocessing liquid op2' is ejected. The amount of the preprocessing liquid op2' is a corrected preprocessing liquid amount, obtained by subtracting a designated amount from the preprocessing liquid op2.

In the second image according to this embodiment, the color ink col2 is ejected to all of the pixel "a" to pixel "d", as represented by the pattern diagram 62. Then the preprocessing liquid op2 is ejected to the pixel "b" and the pixel "c", to which the color ink coil was not ejected to form the first image, and the preprocessing liquid op2' is ejected to the pixel "a" and the pixel "d" to which the color ink coil was ejected.

In this embodiment, the preprocessing liquid op1, the preprocessing liquid op2', and the preprocessing liquid op2 are of the same type, but ejected in different amounts. More specifically, the ejection amount can be expressed as preprocessing liquid op2>preprocessing liquid op1>preprocessing liquid op2', in other words the ejection amount of the preprocessing liquid op2 is largest, and the ejection amount of the preprocessing liquid op2' is smallest. Further, the amount of the preprocessing liquid op2' (corrected preprocessing liquid amount) may be set to zero, depending on the conditions of the amount of the preprocessing liquid op1 and the type and amount of the color ink col1.

Figure 5:
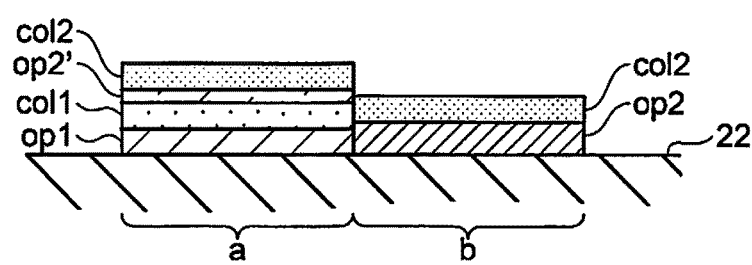
FIG. 5 is a cross-sectional view of a print image.

FIG. 5 is a cross-sectional view taken along a line V-V in FIG. 4A and FIG. 4B, showing the image printed on the medium 22. Further details of FIG. 5 will be subsequently described.

FIG. 6 is a table representing the content of print data D1, which is an example of the print data D. In this embodiment, the print data D1 is a table including information of the type (color) and amount of the ink, the amount of the preprocessing liquid, and the ejection order thereof, in association with each of the pixels (a, b, c, d, . . . ). In the example shown in FIG. 6, the type and amount of the liquid to be ejected are specified in the row direction, with respect to the pixels (a, b, c, d, . . . ) aligned in the column direction. In addition, the row direction also indicates the ejection order of the liquids. Thus, the print data D1 serves as a manual indicating the type and amount of the liquid to be ejected by the printing apparatus 20, and the ejection order of the liquids.

More specifically, the table shown in FIG. 6 indicates that the preprocessing liquid op1 is ejected, as first order of the ejection. To be more detailed, the preprocessing liquid of an amount "p" is ejected as preprocessing liquid op1, to the pixel "a" and the pixel "d", while no liquid is ejected to the pixel "b" and the pixel "c". Then, the color ink coil is ejected as second order of the ejection. The ink of magenta (M) is ejected to the pixel "a" in an amount "q", as color ink coil, and the ink of yellow (Y) is ejected to the pixel "d" in an amount "q", while no liquid is ejected to the pixel "b" and the pixel "c".

The table of FIG. 6 indicates that, thereafter, the preprocessing liquid op2, the preprocessing liquid op2', and the color ink col2 are sequentially ejected. Here, the amount of the preprocessing liquid op2' ejected to the pixel "a" and the pixel "d" (r−α1) is the corrected preprocessing liquid amount obtained by subtracting the designated amount α1 from the liquid amount "r".

Referring now to the flowcharts of FIG. 3A and FIG. 3B, the control (operation) performed by the image processing apparatus 10 will be described hereunder. The process specified in FIG. 3A and FIG. 3B is executed by the CPU installed in the image processing apparatus 10, according to the program stored in the storage unit 11.

First, as shown in FIG. 3A, the first image data corresponding to the first image is acquired from the storage unit 11 (step S01). The storage unit 11 contains either or both of image data stored in advance, and image data acquired from external devices such as a camera and a scanner. Out of such image data, the first image data, corresponding to the image to be first printed on the medium 22, is acquired.

Then the pixel to be printed (target pixel) is identified, on the basis of the first image data (step S02). Here, the target pixel refers to the pixel to which the ink is to be ejected. Since the first image data acquired from the storage unit 11 includes information of the pixel corresponding to the two-dimensional coordinate of the image, the target pixel to which the color ink coi1 is to be ejected is identified, on the basis of the first image data. In this embodiment, as represented by the pattern diagram 61 in FIG. 4A, the pixel "a" and the pixel "d" are identified as the target pixel.

After the target pixels (pixel "a" and the pixel "d") are identified, the amount of the preprocessing liquid op1, to be ejected to the pixel "a" and the pixel "d" before the color ink coi1 is ejected, is determined (step S03, a part of the first conversion process, see pattern diagram 71 in FIG. 4A). Since the color ink coi1 based on the first image data is first ejected to the medium 22, the ejection amount of the preprocessing liquid op1 is the amount of the preprocessing liquid to be ejected when one pixel of the first image data is directly printed on the medium 22 (first preprocessing liquid amount). In this embodiment, the first preprocessing liquid amount is set to a predetermined value "p". The first preprocessing liquid amount "p" is appropriately determined depending on the type of the medium 22, the color ink con, and the preprocessing liquid op1.

The first preprocessing liquid amount "p" determined at step S03 is written and stored in the table constituting the print data D1 (hereinafter, simply print data D1) in the column of the pixel "a" and the pixel "d" (step S04, a part of the generation process, op1 in the row of ejection order 1 in FIG. 6).

Then the color ink coi1 and the amount thereof to be ejected to the target pixels (pixel "a" and pixel "d") are determined, on the basis of the first image data (step S05, a part of the first conversion process, see pattern diagram 61 in FIG. 4A). More specifically, the pixel data expressed by RGB, possessed by the first image data with respect to each pixel, is converted into the ink data expressed by CMYK and the liquid amount, according to the LUT stored in the storage unit 11. In this embodiment, magenta (M) and the amount "q" are determined with respect to the pixel "a", and yellow (Y) and the amount "q" are determined with respect to the pixel "d", as the color ink coi1.

Magenta (M), yellow (Y), and the liquid amount "q" determined at step S05 are written and stored in the print data D1 in the column of the pixel "a" and the pixel "d" (step S06, a part of the generation process, coi1 in the row of ejection order 2 in FIG. 6).

Proceeding to FIG. 3B, second image data corresponding to the second image is acquired from the storage unit 11 (step S07). Then the target pixels are identified on the basis of the second image data, as at step S02 (step S08). In this embodiment, the color ink coi2 is ejected to all of the pixel "a" to pixel "d", as described with reference to the pattern diagram 62 in FIG. 4B.

After the target pixels in the second image data are identified at step S08, the superposition of the target pixel in the second image data and the target pixel in the first image data identified at step S02 is checked (step S09 and step S10).

In the case where the target pixel in the second image data is not superposed on the target pixel in the first image data (N at step S10), the color ink coi2 based on the second image data is ejected on the medium 22, and therefore the ejection amount of the preprocessing liquid opt is set to the amount of the preprocessing liquid to be ejected when one pixel of the first image data is directly printed on the medium 22 (first preprocessing liquid amount) (step S11, a part of the first conversion process). Here, the second preprocessing liquid amount is set to a predetermined value "r". The second preprocessing liquid amount "r" is appropriately determined depending on the type of the medium 22, the color ink coi2, and the preprocessing liquid op2.

In this embodiment, the pixels to which the color ink coi2 is ejected, because the target pixel in the second image data is not superposed on the target pixel in the first image data, are the pixel "b" and the pixel "c" (see pattern diagram 61 in FIG. 4A and pattern diagram 62 in FIG. 4B).

The second preprocessing liquid amount "r" determined at step S11 is written and stored in the print data D1, in the column of the pixel "b" and the pixel "c" (step S12, a part of the generation process, op2 in the row of ejection order 3 in FIG. 6).

In contrast, in the case where the target pixel in the second image data is superposed on the target pixel in the first image data (Y at step S10), in other words a first layered pixel is to be formed, the color ink coi2 based on the second image data is ejected on the color ink coi1 based on the first image data, and therefore the ejection amount of the preprocessing liquid op2' is set to be less than the second preprocessing liquid amount "r". More specifically, the amount of the preprocessing liquid op2' is set to the corrected preprocessing liquid amount (r−α1) obtained by subtracting the designated amount α1 from the second preprocessing liquid amount "r" (step S13, second conversion process).

The above is because the amount of the preprocessing liquid op2' to be applied may be less than the second preprocessing liquid amount "r", for the following reasons.

First, the surface of the ink layer (color ink coi1) more effectively restricts the newly ejected ink (color ink coi2) from spreading, than the surface of the medium 22 which is non-absorbent.

Second, when a large amount of the preprocessing liquid op1 (first preprocessing liquid) is applied to fix the color ink coi1, the preprocessing liquid op1 may contribute to improving the fixability of the color ink coi2, via the layer of the color ink coi1.

Third, the preprocessing liquid op2' applied on the color ink coi1 to fix the color ink coi2 may contribute to improving the fixability of the color ink coi1.

For the mentioned reasons, the preprocessing liquid op2' can be set to an appropriate corrected preprocessing liquid amount (r−α1), by determining the designated amount (designated amount α1) on the basis of at least one of the first preprocessing liquid amount "p", and the type and amount of the ink (color ink coi1). In this embodiment, the pixel "a" and the pixel "d" are the first layered pixels (see pattern diagram 61 in FIG. 4A and pattern diagram 62 in FIG. 4B).

Further, primarily for the first reason above, the designated amount α1 may be set to the value equal to the second preprocessing liquid amount "r", thus to make the corrected preprocessing liquid amount, applied on the color ink coi1, zero. In this case, the amount of the preprocessing liquid for printing the first layered pixel becomes equal to the first preprocessing liquid amount "p", and therefore the preprocessing liquid can be saved to the maximum extent, in the printing process of the first layered pixel.

The corrected preprocessing liquid amount (r−α1) determined at step S13 is written and stored in the print data D1 in the column of the pixel "a" and the pixel "d" (step S14, a part of the generation process, op2 in the row of ejection order 4 in FIG. 6).

Then the color ink col2 to be ejected to the target pixels (pixel "a" to pixel "d") and the amount thereof are determined, on the basis of the second image data (step S15, see pattern diagram 62 in FIG. 4B). More specifically, the pixel data of the pixel "a" to pixel "d" possessed by the second image data is converted into white (W) as the color ink col2, and the liquid amount "s", as at step S05. White (W) and the liquid amount "s" determined at step S15 is written and stored in the print data D1, in the column of the pixel "a" to the pixel "d" (step S16, col2 in the row of ejection order 5 in FIG. 6).

As described above, the first image data is converted into the amount of the preprocessing liquid op1 and the type and amount of the color ink coil to be used for the printing, at step S03 and step S05. Then at step S11, step S13, and step S15, the second image data is converted into the amount of the preprocessing liquid op2 and op2', and the type and amount of the color ink col2 to be used for the printing. Therefore, step S03, step S05, step S11, step S13, and step S15 correspond to the function of the color conversion unit 12, including converting the image data into the amount of the preprocessing liquid and the type and amount of the ink, to be used for the printing (first conversion process). In particular, step S13 correspond to the function of the color conversion unit 12, including determining the corrected preprocessing liquid amount (r−α1) such that the amount of the preprocessing liquid for printing the first layered pixel, in which the target pixel of the second image data is superposed on the target pixel of the first image data, becomes less than the total of the first preprocessing liquid amount "p" and the second preprocessing liquid amount "r" (second conversion process).

At step S04 and step S06, the print data D1 is generated on the basis of the amount of the preprocessing liquid op1 and the type and amount of the color ink col1, to be used to print the first image data. Then at step S12, step S14, and step S16, the print data D1 is generated on the basis of the amount of the preprocessing liquid op2 and op2' and the type and amount of the color ink col2, to be used to print the second image data. Therefore, step S04, step S06, step S12, step S14, and step S16 correspond to the function of the print data generation unit 13 including generating the print data D1 on the basis of the amount of the preprocessing liquid and the type and amount of the ink (generation process).

Through the foregoing operation of the image processing apparatus 10, the print data D1 shown in FIG. 6 is generated, and the printing apparatus 20 receives the print data D1 and prints the image by ejecting the preprocessing liquid and the ink to each of the pixels according to the content of the print data D1. To be more detailed, the image is printed through ejecting the preprocessing liquid op1 to the pixels shown in the pattern diagram 71, ejecting the color ink col1 to the pixels shown in the pattern diagram 61, ejecting the preprocessing liquid op2 or op2' to the pixels shown in the pattern diagram 72, and then ejecting the color ink col2 to the pixels shown in the pattern diagram 62.

As result, the pixel "a" forms the image in which the preprocessing liquid op1, the color ink col1, the preprocessing liquid op2', and the color ink col2 are sequentially superposed, and the pixel "b" forms the image in which the preprocessing liquid op2 and the color ink col2 are sequentially superposed, as shown in FIG. 5. Further, though not illustrated, in the pixel "c" the preprocessing liquid op2 and the color ink col2 are superposed as in the pixel "b", and the preprocessing liquid op1, the color ink col1, the preprocessing liquid op2', and the color ink col2 are superposed in the pixel "d", as in the pixel "a". Here, as described earlier, when the amount of the preprocessing liquid op2' is set to zero, the layer of the preprocessing liquid op2' shown in FIG. 5 is excluded, and the color ink col1 and the color ink col2 are directly superposed.

Advantageous Effects

As described above, in the first embodiment the designated amount α1 is subtracted from the amount of the preprocessing liquid to be ejected on the color ink col1, with respect to the pixel in which the color ink col1 and the color ink col2 are superposed. Therefore, the amount of the preprocessing liquid used to fix the color ink col2 can be reduced, and the preprocessing liquid can be saved.

In addition, the designated amount α1 to be subtracted is determined according to the amount of the preprocessing liquid used to fix the color ink col1, and the type and amount of the color ink col1, and therefore an appropriate reduction amount of the preprocessing liquid can be determined so as to save the preprocessing liquid, and the image that exhibits improved ink fixability and color-forming performance can be formed on the medium 22.

Further, when the color ink col2 ejected on the color ink col1 spreads only to a negligible extent with respect to the image formed on the medium 22, the amount of the preprocessing liquid (corrected preprocessing liquid amount) to be ejected on the color ink coil may be set to zero. As result, the amount of the preprocessing liquid for printing the first layered pixel becomes equal to the first preprocessing liquid amount "p", and therefore the preprocessing liquid can be saved to the maximum extent, in the printing process of the first layered pixel.

Second Embodiment

Referring now to FIG. 7A, FIG. 7B, FIG. 7C, and FIG. 8, the print data D generated by the image processing apparatus 10, to print a different type of layered pixels, will be described as a second embodiment. The second embodiment represents the generation of the print data D for forming an image by superposing the second image on the first image after printing the first image on the medium 22, and further superposing a third image. Hereinafter, the pixel in which one pixel of the third image is superposed on at least either of one pixel of the first image and one pixel of the second image will be referred to as a second layered pixel.

Figure 7A:
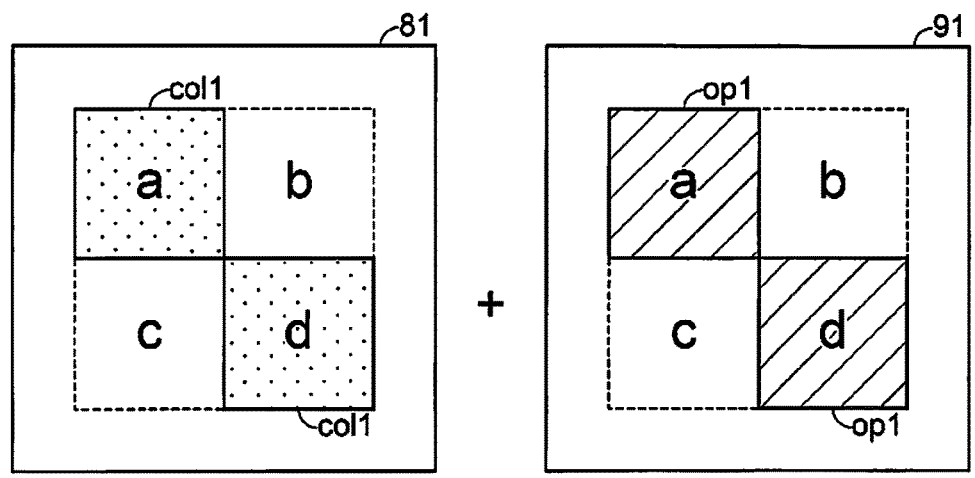
FIG. 7A includes pattern diagrams for explaining a first image according to a second embodiment.

FIG. 7A includes pattern diagrams of the pixels to which the ink and the preprocessing liquid are ejected to print the first image. In FIG. 7A, a pattern diagram 81 represents, like the pattern diagram 61 in FIG. 4A, the case where the color ink coil is ejected to the pixel "a" and the pixel "d". A pattern diagram 91 represents the case where the preprocessing liquid opt is ejected to the pixel "a" and the pixel "d".

Figure 7B:
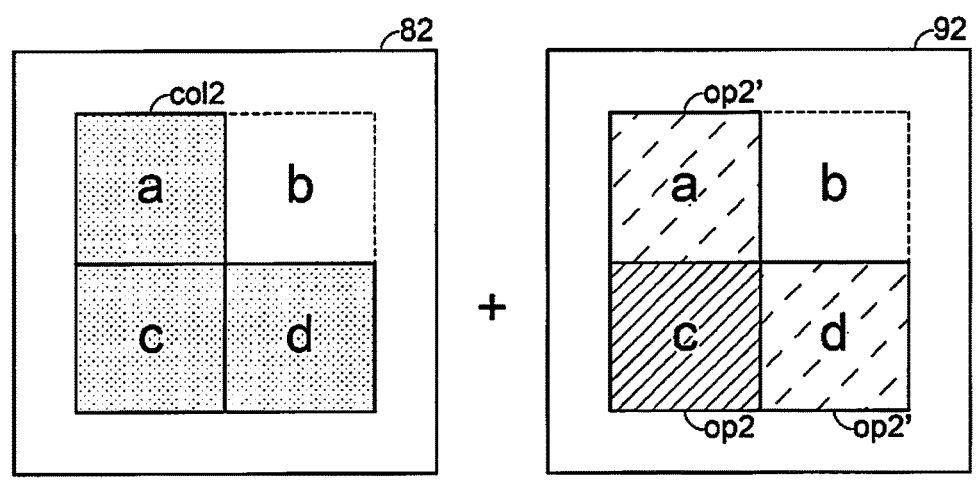
FIG. 7B includes pattern diagrams for explaining a second image according to the second embodiment.

FIG. 7B includes pattern diagrams of the pixels to which the ink and the preprocessing liquid are ejected to print the second image. In FIG. 7B, a pattern diagram 82 represents the case where the color ink col2 is ejected to the pixel "a", pixel "c", and the pixel "d". A pattern diagram 92 represents the case where the preprocessing liquid op2' is ejected to the pixel "a" and the pixel "d", and the preprocessing liquid op2 is ejected to the pixel "c".

Figure 7C:
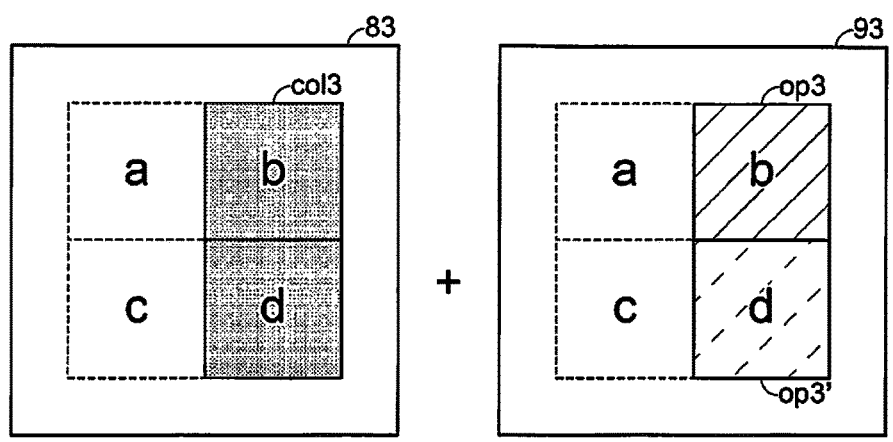
FIG. 7C includes pattern diagrams for explaining a third image according to the second embodiment.

FIG. 7C includes pattern diagrams of the pixels to which the ink and the preprocessing liquid are ejected to print the third image. In FIG. 7C, a pattern diagram 83 represents the case where the color ink col3 is ejected to the pixel "b" and the pixel "d". A pattern diagram 93 represents the case where a preprocessing liquid op3 is ejected to the pixel "b", and a preprocessing liquid op3' is ejected to the pixel "d".

FIG. 8 is a table representing the content of print data D2, which is an example of the print data D.

As in the first embodiment, the color conversion unit 12 of the image processing apparatus 10 converts the first image data (see FIG. 7A) corresponding to the first image into the amount of the preprocessing liquid and the type and amount of the ink, to be used for the printing. The print data generation unit 13 writes and stores the amount of the preprocessing liquid and the type and amount of the ink, converted as above, in a table constituting the print data D2.

More specifically, the first preprocessing liquid amount "p" is written and stored in the row of the ejection order 1 (op1) in the print data D2 (see FIG. 8), in the column of the pixel "a" and the pixel "d" to which the color ink coil is ejected. The first preprocessing liquid amount "p" corresponds to the amount of the preprocessing liquid ejected when the one pixel of the first image data is directly printed on the medium 22. In the row of the ejection order 2 (col1) in the print data D2, magenta (M) and the amount "q", and yellow (Y) and the amount "q" are written and stored with respect to the pixel "a" and the pixel "d" respectively, as the converted color ink coil and the amount thereof.

Then the color conversion unit 12 converts the second image data (see FIG. 7B) corresponding to the second image, into the preprocessing liquid op2, the preprocessing liquid op2', and the color ink col2 to be used for the printing.

In this embodiment, as shown in FIG. 7B, the pixel "c" does not have a target pixel based on the first image data, and therefore the color ink col2 is directed ejected onto the medium 22. Accordingly, the second preprocessing liquid amount "r" is written and stored in the row of the ejection order 3 (op2) in the print data D2. The second preprocessing liquid amount "r" corresponds to the amount of the preprocessing liquid ejected when the one pixel of the second image data is directly printed on the medium 22.

Since the pixel "a" and the pixel "d" are the first layered pixels in which the first image data has already been printed, the amount of the preprocessing liquid to be ejected is set, as in the first embodiment, to the corrected preprocessing liquid amount (r−α1) obtained by subtracting the designated amount α1 from the second preprocessing liquid amount "r", and written and stored in the row of the ejection order 4 (op2') in the print data D2.

Then, white (W) and the liquid amount "s" are determined with respect to the pixel "a", the pixel "c", and the pixel "d", as the color ink col2 and the amount thereof converted by the color conversion unit 12, and written and stored in the row of the ejection order 5 (col2) in the print data D2.

The color conversion unit 12 then converts the third image data (see FIG. 7C) corresponding to the third image into the preprocessing liquid op3, the preprocessing liquid op3', and the color ink col3, to be used for the printing. In this embodiment, as shown in FIG. 7C, the color ink col3 is ejected to the pixel "b" and the pixel "d".

The pixel "b" does not have a target pixel based on the first image data and a target pixel based on the second image data, and therefore the color ink col3 is directly ejected onto the medium 22. Accordingly, a third preprocessing liquid amount "t" is written and stored in the row of the ejection order 6 (op3) in the print data D2. The third preprocessing liquid amount "t" corresponds to the amount of the preprocessing liquid ejected when one pixel of the third image data is directly printed on the medium 22.

The pixel "d" is the second layered pixel, in which the first image data and the second image data have already been printed, and therefore the amount of the preprocessing liquid to be ejected is set to the corrected preprocessing liquid amount (t−α2) obtained by subtracting a designated amount α2 from the third preprocessing liquid amount "t", and written and stored in the row of the ejection order 7 (op3') in the print data D2.

Here, the designated amount α2 is determined, like the designated amount α1, on the basis of at least one of the amount of the preprocessing liquid used to fix the ink of the lower layer, and the type and amount of the ink of the lower layer. More specifically, for example, by setting the designated amount α2 to the first preprocessing liquid amount "p", the amount of the preprocessing liquid for printing the second layered pixel becomes (p+(r−α1)+(t−p)) (t+r−α1), which is less than the total of the second preprocessing liquid amount "r" and the third preprocessing liquid amount "t".

Then the color ink col3 and the amount thereof to be ejected to the target pixel (pixel "b" and the pixel "d") are determined, on the basis of the third image data. More specifically, as at step S05, the pixel data of the pixel "b" possessed by the third image data is converted to cyan (C) and the liquid amount "q" as the color ink col3, and the pixel data of the pixel "d" is converted to black (K) and the liquid amount "q". Such converted data is written and stored in the row of the ejection order 8 (col3) in the print data D2.

Through the foregoing operation, the image processing apparatus 10 generates the print data D2 shown in FIG. 8. The printing apparatus 20 receives the print data D2, and ejects the preprocessing liquid and the ink to each of the pixels according to the content of the print data D2, to thereby sequentially print the first image, the second image, and the third image.

Advantageous Effects

According to the second embodiment, as described above, the image processing apparatus 10 can generate the print data D2 such that the amount of the preprocessing liquid becomes less than the total of the first preprocessing liquid amount and the third preprocessing liquid amount, or the total of the second preprocessing liquid amount and the third preprocessing liquid amount, when the second layered pixel, in which the one pixel of the third image is superposed on at least either of the one pixel of the first image and the one pixel of the second image, is to be printed. Therefore, the preprocessing liquid can be saved.

Further, when the color ink col2 ejected on the color ink coil spreads only to a negligible extent with respect to the image formed on the medium 22, the corrected preprocessing liquid amount (r−α1) to be ejected on the color ink coil may be set to zero. In addition, when the color ink col3 ejected on the color ink coil or color ink col2 spreads only to a negligible extent with respect to the image formed on the medium 22, the corrected preprocessing liquid amount (t−α2) to be ejected on the color ink coil or color ink col2 may be set to zero. As result, the preprocessing liquid can be saved to the maximum extent, in the printing process of the second layered pixel.

VARIATIONS

Although the first and second embodiments of the invention have been described as above, those embodiments may be modified in various manners, within the scope of the invention, for example as the following variations.

Variation 1

Although the image processing apparatus 10 and the printing apparatus 20 are provided as separate apparatuses in the foregoing embodiments, the image processing apparatus 10 may be incorporated in the printing apparatus 20. In this case, when the printing process includes superposing the images, the printing apparatus 20 can reduce the consumption of the preprocessing liquid to be used for the printing, without the need to employ an external device such as a PC, and form the image that exhibits improved ink fixability and color-forming performance.

Variation 2

Since only one type of preprocessing liquid is employed in the foregoing embodiments, the color conversion unit 12 is configured to determine only the amount of the preprocessing liquid to be ejected to the target pixel. However, a plurality of types of preprocessing liquid may be employed in the printing apparatus 20, in which case the color conversion unit 12 may determine an optimal preprocessing liquid for the ink to be ejected, and the amount of such preprocessing liquid. With such a configuration, an image that exhibits improved ink fixability and color-forming performance can be formed on the medium 22. In this case, further, it is preferable to provide a plurality of first nozzle rows on the ejecting surface of the printing head 36 (see FIG. 2), according to the number of types of the preprocessing liquid.

Variation 3

According to the foregoing embodiments, the amount of the preprocessing liquid to be applied for the ink of the upper layer is corrected, both in the first layered pixel and in the second layered pixel. However, the amount of the preprocessing liquid applied for the ink of the lower layer may be corrected, according to the amount of the ink of the lower layer, and the amount of the preprocessing liquid applied for the ink of the upper layer. Such an arrangement increases the degree of freedom in the correction of the preprocessing liquid amount.

The invention is not limited to the foregoing embodiments and variations, but may be realized in various different manners within the scope of the invention. For example, the technical features described in the embodiments and variations may be substituted or combined as desired, to eliminate all or a part of the conventional drawbacks, or attain all or a part of the foregoing advantageous effects. Further, any of the technical features may be excluded, unless such features are herein described as mandatory.

This application claims priority under 35 U.S.C. § 119 to Japanese Patent Application No. 2017-116545, filed Jun. 14, 2017. The entire disclosure of Japanese Patent Application No. 2017-116545 is hereby incorporated herein by reference.

What is claimed is:

1. An image processing apparatus configured to generate print data to be outputted to a printing apparatus that prints an image by ejecting preprocessing liquid and ink onto a medium, the image processing apparatus comprising:
    a color conversion unit that converts image data representing the image into an amount of the preprocessing liquid, and a type and an amount of the ink for printing the image; and
    a print data generation unit that generates the print data on a basis of the amount of the preprocessing liquid and the type and amount of the ink,
    wherein the color conversion unit converts the image data such that, when the amount of the preprocessing liquid for printing one pixel of a first image on the medium is defined as a first preprocessing liquid amount, and the amount of the preprocessing liquid for printing one pixel of a second image on the medium is defined as a second preprocessing liquid amount, the amount of the preprocessing liquid for printing a first layered pixel, in which the preprocessing liquid for printing the one pixel of the first image, the ink for printing the first image, the preprocessing liquid for printing the one pixel of the second image, and the ink for printing the second image are superposed to each other such that the preprocessing liquid for printing the one pixel of the second image is positioned between the ink for printing the first image and the ink for printing the second image, becomes less than a total of the first preprocessing liquid amount and the second preprocessing liquid amount.

2. The image processing apparatus according to claim 1, wherein, when the one pixel of the second image is superposed on the one pixel of the first image in the first layered pixel,
    the color conversion unit performs the conversion such that the amount of the preprocessing liquid for printing the first layered pixel accords with a total of the first preprocessing liquid amount, and a corrected preprocessing liquid amount obtained by subtracting a designated amount from the second preprocessing liquid amount.

3. The image processing apparatus according to claim 2, wherein the designated amount is determined on a basis of at least one of the first preprocessing liquid amount, and a type and an amount of the ink for printing the one pixel of the first image in the first layered pixel.

4. The image processing apparatus according to claim 2, wherein the print data generation unit generates the print data with respect to the first layered pixel, including the first preprocessing liquid amount, an amount of the ink for printing the one pixel of the first image, an amount of the corrected preprocessing liquid, an amount of the ink for printing the one pixel of the second image, and an ejection order of the preprocessing liquid and the ink.

5. The image processing apparatus according to claim 1, wherein the color conversion unit performs the conversion such that the amount of the preprocessing liquid for printing the first layered pixel becomes equal to the first preprocessing liquid amount.

6. A printing apparatus comprising a printing unit that performs printing on a basis of print data,
    wherein the printing unit is configured to perform the printing on a basis of the print data generated by the image processing apparatus according to claim 1.

7. A printing apparatus comprising a printing unit that performs printing on a basis of print data,
    wherein the printing unit is configured to perform the printing on a basis of the print data generated by the image processing apparatus according to claim 2.

8. A printing apparatus comprising a printing unit that performs printing on a basis of print data,
    wherein the printing unit is configured to perform the printing on a basis of the print data generated by the image processing apparatus according to claim 3.

9. A printing apparatus comprising a printing unit that performs printing on a basis of print data,
 wherein the printing unit is configured to perform the printing on a basis of the print data generated by the image processing apparatus according to claim 4.

10. A printing apparatus comprising a printing unit that performs printing on a basis of print data,
 wherein the printing unit is configured to perform the printing on a basis of the print data generated by the image processing apparatus according to claim 5.

11. An image processing apparatus configured to generate print data to be outputted to a printing apparatus that prints an image by ejecting preprocessing liquid and ink onto a medium, the image processing apparatus comprising:
 a color conversion unit that converts image data representing the image into an amount of the preprocessing liquid, and a type and an amount of the ink for printing the image; and
 a print data generation unit that generates the print data on a basis of the amount of the preprocessing liquid and the type and amount of the ink,
 wherein the color conversion unit converts the image data such that, when the amount of the preprocessing liquid for printing one pixel of a first image on the medium is defined as a first preprocessing liquid amount, and the amount of the preprocessing liquid for printing one pixel of a second image on the medium is defined as a second preprocessing liquid amount, the amount of the preprocessing liquid for printing a first layered pixel, in which the one pixel of the second image is superposed on the one pixel of the first image, becomes less than a total of the first preprocessing liquid amount and the second preprocessing liquid amount, wherein,
 in a case where a third image is to be superposed on at least one of an amount of the first image and the second image, and
 when the preprocessing liquid for printing one pixel of the third image on the medium is defined as a third preprocessing liquid amount,
 the color conversion unit converts the image data such that the amount of the preprocessing liquid for printing a second layered pixel, in which the one pixel of the third image is superposed on at least one of the one pixel of the first image and the one pixel of the second image, becomes less than a total of at least one of the first preprocessing liquid amount and the second preprocessing liquid amount, and the third preprocessing liquid amount.

12. A non-transitory computer-readable medium storing a program for controlling an image processing apparatus that generates print data for printing an image by ejecting preprocessing liquid and ink onto a medium, the program being configured to cause the image processing apparatus to execute:
 a first conversion process including converting image data representing the image into an amount of the preprocessing liquid for printing the image and a type and an amount of the ink;
 a generation process including generating the print data on a basis of the amount of the preprocessing liquid and the type and amount of the ink; and
 a second conversion process including converting the image data such that, when the amount of the preprocessing liquid for printing one pixel of a first image on the medium is defined as a first preprocessing liquid amount, and the amount of the preprocessing liquid for printing one pixel of a second image on the medium is defined as a second preprocessing liquid amount, the amount of the preprocessing liquid for printing a first layered pixel, in which the preprocessing liquid for printing the one pixel of the first image, the ink for printing the first image, the preprocessing liquid for printing the one pixel of the second image, and the ink for printing the second image are superposed to each other such that the preprocessing liquid for printing the one pixel of the second image is positioned between the ink for printing the first image and the ink for printing the second image, becomes less than a total of the first preprocessing liquid amount and the second preprocessing liquid amount.

13. A printing apparatus comprising a printing unit that performs printing on a basis of print data,
 wherein the printing unit is configured to perform the printing on a basis of the print data generated by the image processing apparatus according to claim 11.

* * * * *